US012736433B2

(12) United States Patent
Rakshit et al.

(10) Patent No.: US 12,736,433 B2
(45) Date of Patent: Sep. 15, 2026

(54) METHOD AND SYSTEM FOR UNOBSTRUSIVE AUTOMATIC LEAK EVENT DETECTION IN REAL-TIME CONDUIT BY TEMPLATE SELECTION

(71) Applicant: Tata Consultancy Services Limited, Mumbai (IN)

(72) Inventors: Raj Rakshit, Kolkata (IN); Arijit Sinharay, Kolkata (IN); Supriya Gain, Kolkata (IN); Arpan Pal, Kolkata (IN); Chirabrata Bhaumik, Kolkata (IN); Tapas Chakravarty, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 596 days.

(21) Appl. No.: 18/218,815

(22) Filed: Jul. 6, 2023

(65) Prior Publication Data

US 2024/0053221 A1 Feb. 15, 2024

(30) Foreign Application Priority Data

Aug. 13, 2022 (IN) ............................ 202221046230

(51) Int. Cl.
*G01M 3/24* (2006.01)
*G01M 3/28* (2006.01)

(52) U.S. Cl.
CPC .......... *G01M 3/243* (2013.01); *G01M 3/2815* (2013.01)

(58) Field of Classification Search
CPC ........................... G01M 3/243; G01M 3/2815
See application file for complete search history.

(56) References Cited

U.S. PATENT DOCUMENTS 11,359,989 B2 * 6/2022 Nash .................. G01M 3/2815
2023/0332976 A1 * 10/2023 Chen ......................... F17D 5/02

FOREIGN PATENT DOCUMENTS

EP 2 936 106 A1 10/2015
EP 2 440 901 B1 6/2019
KR 101876730 B1 * 8/2018 ............ G06Q 50/06

OTHER PUBLICATIONS

Adegboye et al., "Recent Advances in Pipeline Monitoring and Oil Leakage Detection Technologies: Principles and Approaches", Sensors, vol. 19, No. 2548, Jun. 4, 2019 (Jun. 4, 2019), pp. 1-36, XP055808103 (Year: 2019).*

(Continued)

*Primary Examiner* — Shelby A Turner
*Assistant Examiner* — Xiuqin Sun
(74) *Attorney, Agent, or Firm* — FINNEGAN, HENDERSON, FARABOW, GARRETT & DUNNER LLP

(57) ABSTRACT

One of the biggest challenges faced by oil and gas companies is to monitor such long pipelines for leak events and generate false leak event alarms during routine pipe maintenance. A data associated with a first sensing unit is processed to obtain an instant timing information ($T_0$) of a leak event in a conduit at a test environment. A data associated with a second sensing unit is processed to obtain a transient signal associated with the leak event at a specific band. An accelerometer data is filtered to obtain a band passed filtered accelerometer signal ($Accel_{bpf}$). The $Accel_{bpf}$ is truncated in a time domain from the $T_0$ to a duration $T_d$ of the leak event to obtain a temporal template signal ($Accel_{template}$). A leak event of a real-time conduit is dynamically detected at a physical environment based on $Accel_{template}$ when a cross-correlation value is greater than a threshold value ($\propto$).

15 Claims, 8 Drawing Sheets

(56) References Cited

OTHER PUBLICATIONS

Hadi et al., "In-Situ Pipeline Monitoring System Design for Identifying and Locating Damaging Activities Based on Wireless Sensor Network," Iraqi Journal of Computers, Communications, Control & Systems Engineering (IJCCCE), 20(2) (2020).
Hou et al., "An Improved Negative Pressure Wave Method for Natural Gas Pipeline Leak Location Using FBG Based Strain Sensor and Wavelet Transform," (2013).
Rizwan et al., "Leak Detection in Pipeline System Based on Flow Induced Vibration Methodology in Pipeline," International Journal of Science and Research (IJSR) (2013).
Yang, "Leak Flow Rate Estimation in Liquid Pipeline with Vibration Analysis," Master of Science Thesis (2022).

* cited by examiner receiving, via one or more hardware processors, at least one data associated with a first sensing unit and a second sensing unit placed in a proximity of a conduit at a test environment 302 processing, via the one or more hardware processors, the at least one data associated with the first sensing unit to obtain an instant timing information ($T_0$) of a leak event in the conduit at the test environment 304 processing, via the one or more hardware processors, the at least one data associated with the second sensing unit to obtain a transient signal associated with the leak event at a specific band by applying a continuous wavelet transformation (CWT) 306 filtering, by a bandpass filter, an accelerometer data (Accel) to obtain a band passed filtered accelerometer signal ($Accel_{bpf}$) with a low pass cut-off frequency and a high pass cut-off frequency 308

A

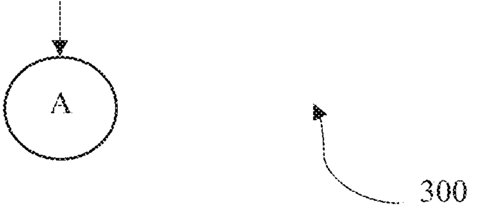

FIG. 3A

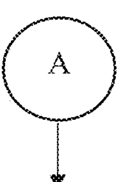

processing, via the one or more hardware processors, the band passed filtered accelerometer signal (Accelbpf) to obtain a duration ($T_d$) of the leak event 310 truncating, via the one or more hardware processors, the band passed filtered accelerometer signal (Accelbpf) in a time domain from the instant timing information ($T_0$) to the duration ($T_d$) of the leak event to obtain a temporal template signal (Acceltemplate) 312 cross-correlating, via the one or more hardware processors, a band passed filtered accelerometer signal (Accelbpf) with the temporal template signal (Acceltemplate) for every successive window of $T_0$ and $T_d$ length to obtain a cross correlation value 314 dynamically detecting, via the one or more hardware processors, a leak event of a real-time conduit at a physical environment when the cross-correlation value is greater than a threshold value ($\propto$) 316

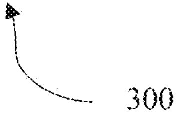

METHOD AND SYSTEM FOR UNOBSTRUSIVE AUTOMATIC LEAK EVENT DETECTION IN REAL-TIME CONDUIT BY TEMPLATE SELECTION

PRIORITY CLAIM

This U.S. patent application claims priority under 35 U.S.C. § 119 to: India Application No. 202221046230, filed on Aug. 13, 2022. The entire contents of the aforementioned application are incorporated herein by reference.

TECHNICAL FIELD

This disclosure relates generally to leak event detection system, and, more particularly, to method and system for unobstrusive automatic leak event detection in real-time conduit by template selection.

BACKGROUND

Oil and Gas is a common source to meet ever-increasing energy demand in the world. The oil and gas transport from one location to another location via pipelines. These pipelines run inter-country to inter-continents. One of the biggest challenges faced by oil and gas companies is to monitor such long pipelines for leak events, as unattended leaks may cause a catastrophe (i.e., environmental hazards, life loss, economic loss etc.). Various techniques have been developed in the past for real time monitoring of these pipelines. A fundamental problem with most of the existing nondestructive testing (NDT) techniques (i.e., ultrasound, and thermal camera etc.) is that they can only monitor leaks locally (i.e., max ~200 meters from one or more sensors) and one needs to put multiple sensors very frequently to monitor pipelines that run for hundreds of kilometers. This makes the solution not feasible both from cost and maintenance perspective. However, one sensing modality called a negative pressure wave (NPW) can monitor leaks from a very long distance (i.e., ~10 km) and can be detected since low frequencies have significantly less attenuation in fluids. The NPW consists of low frequency waves (i.e., ~100 to 150 Hz) that are generated by sudden leak events and wavefront travels at speed of sound inside fluid in both upstream and downstream directions. Most existing NPW techniques rely on invasive pressure sensors for their enhanced reliability. Accelerometer-based NPW techniques, although more attractive to industrial use-cases due to their unobtrusive, easy-to-install nature and maintainability, come with their challenges. It is very difficult to discriminate the NPW signatures from an unknown signatures.

Machine learning (ML) based approach requires multiple trials which further complicates lab-based model efforts. Further, a model generation is way more complicated, depends on multiple sensor input and correct parameter values and is computationally time consuming. Another approach which utilizes Kalman filter-based model highly depends on choosing proper process covariance matrix which requires extensive tuning efforts, and the convergence is not always guaranteed. Another challenge with the Kalman filter is linearization of the highly non-linear systems with gaussian noise approximation. As all systems are non-linear and for small data lengths both measurement and process noise are random in nature. Accordingly, the false alarm rate is a big issue in case of oil and gas pipeline leak detection. The sensors are susceptible to environmental noises and are generally likely to generate false leak event alarms during routine pipe maintenance jobs.

SUMMARY

Embodiments of the present disclosure present technological improvements as solutions to one or more of the above-mentioned technical problems recognized by the inventors in conventional systems. For example, in one aspect, a processor implemented method of detecting leak event in a real-time conduit by a template selection is provided. The processor implemented method includes at least one of: receiving, via one or more hardware processors, data associated with a first sensing unit and a second sensing unit; processing, via the one or more hardware processors, the data associated with the first sensing unit to obtain an instant timing information ($T_0$) of a leak event in a conduit at a test environment; processing, via the one or more hardware processors, the data associated with the second sensing unit to obtain a transient signal associated with the leak event at a specific band by applying a continuous wavelet transformation (CWT); filtering, by a bandpass filter, an accelerometer data (Accel) to obtain a band passed filtered accelerometer signal ($Accel_{bpf}$) with a low pass cut-off frequency and a high pass cut-off frequency; processing, via the one or more hardware processors, the band passed filtered accelerometer signal ($Accel_{bpf}$) to obtain a duration ($T_d$) of the leak event; truncating, via the one or more hardware processors, the band passed filtered accelerometer signal ($Accel_{bpf}$) in a time domain from the instant timing information ($T_0$) to the duration ($T_d$) of the leak event to obtain a temporal template signal ($Accel_{template}$); cross-correlating, via the one or more hardware processors, a band passed filtered accelerometer signal ($Accel_{bpf}$) associated with a real-time conduit at a physical environment and the temporal template signal ($Accel_{template}$) for every successive window of $T_0$ to $T_d$ length to obtain a cross correlation value; and dynamically detecting, via the one or more hardware processors, a leak event of the real-time conduit at the physical environment when the cross-correlation value is greater than a threshold value ($\propto$). The first sensing unit and the second sensing unit are placed in a proximity of a conduit at a test environment.

In an embodiment, the conduit at the test environment is constructed based on (a) a pipe diameter, (b) a pipe thickness, (c) a material, (d) a flowing fluid, and (e) a pressure level at the real-time conduit. In an embodiment, the first sensing unit corresponds to a pressure sensor for obtaining a pressure data (Pr). In an embodiment, the second sensing unit corresponds to an accelerometer sensor for obtaining the accelerometer data (Accel). In an embodiment, the instant timing information ($T_0$) is obtained by detecting a variation in a steady state of a pressure value of a fluid at the conduit at the test environment. In an embodiment, the transient signal corresponds to a pressure wavefront travelling through a fluid inside the conduit at the test environment.

In another aspect, there is provided a system for detection of leak event in a real-time conduit by a template selection. The system includes a memory storing instructions; one or more communication interfaces; and one or more hardware processors coupled to the memory via the one or more communication interfaces, wherein the one or more hardware processors are configured by the instructions to: receive, data associated with a first sensing unit and a second sensing unit; process, the data associated with the first sensing unit to obtain an instant timing information ($T_0$) of a leak event in a conduit at a test environment; process, the data associated with the second sensing unit to obtain a transient signal associated with the leak event at a specific band by applying a continuous wavelet transformation (CWT); filter, by a bandpass filter, an accelerometer data (Accel) to obtain a band passed filtered accelerometer signal ($Accel_{bpf}$) with a low pass cut-off frequency and a high pass cut-off frequency; process, the band passed filtered accelerometer signal ($Accel_{bpf}$) to obtain a duration ($T_d$) of the leak event; truncate, the band passed filtered accelerometer signal ($Accel_{bpf}$) in a time domain from the instant timing information ($T_0$) to the duration ($T_d$) of the leak event to obtain a temporal template signal ($Accel_{template}$); cross-correlate, a band passed filtered accelerometer signal ($Accel_{bpf}$) associated with a real-time conduit at a physical environment and the temporal template signal ($Accel_{template}$) for every successive window of $T_0$ to $T_d$ length to obtain a cross correlation value; and dynamically detect, a leak event of the real-time conduit at the physical environment when the cross-correlation value is greater than a threshold value ($\propto$). The first sensing unit and the second sensing unit are placed in a proximity of a conduit at a test environment.

In an embodiment, the conduit at the test environment is constructed based on (a) a pipe diameter, (b) a pipe thickness, (c) a material, (d) a flowing fluid, and (e) a pressure level at the real-time conduit. In an embodiment, the first sensing unit corresponds to a pressure sensor for obtaining a pressure data (Pr). In an embodiment, the second sensing unit corresponds to an accelerometer sensor for obtaining the accelerometer data (Accel). In an embodiment, the instant timing information ($T_0$) is obtained by detecting a variation in a steady state of a pressure value of a fluid at the conduit at the test environment. In an embodiment, the transient signal corresponds to a pressure wavefront travelling through a fluid inside the conduit at the test environment.

In yet another aspect, there are provided one or more non-transitory machine readable information storage mediums comprising one or more instructions which when executed by one or more hardware processors causes at least one of: receiving, data associated with a first sensing unit and a second sensing unit; processing, the data associated with the first sensing unit to obtain an instant timing information ($T_0$) of a leak event in a conduit at a test environment; processing, the data associated with the second sensing unit to obtain a transient signal associated with the leak event at a specific band by applying a continuous wavelet transformation (CWT); filtering, by a bandpass filter, an accelerometer data (Accel) to obtain a band passed filtered accelerometer signal ($Accel_{bpf}$) with a low pass cut-off frequency and a high pass cut-off frequency; processing, the band passed filtered accelerometer signal ($Accel_{bpf}$) to obtain a duration ($T_d$) of the leak event; truncating, the band passed filtered accelerometer signal ($Accel_{bpf}$) in a time domain from the instant timing information ($T_0$) to the duration ($T_d$) of the leak event to obtain a temporal template signal ($Accel_{template}$); cross-correlating, a band passed filtered accelerometer signal ($Accel_{bpf}$) associated with a real-time conduit at a physical environment and the temporal template signal ($Accel_{template}$) for every successive window of $T_0$ to $T_d$ length to obtain a cross correlation value; and dynamically detecting, a leak event of the real-time conduit at the physical environment when the cross-correlation value is greater than a threshold value ($\propto$). The first sensing unit and the second sensing unit are placed in a proximity of a conduit at a test environment.

In an embodiment, the conduit at the test environment is constructed based on (a) a pipe diameter, (b) a pipe thickness, (c) a material, (d) a flowing fluid, and (e) a pressure level at the real-time conduit. In an embodiment, the first sensing unit corresponds to a pressure sensor for obtaining a pressure data (Pr). In an embodiment, the second sensing unit corresponds to an accelerometer sensor for obtaining the accelerometer data (Accel). In an embodiment, the instant timing information ($T_0$) is obtained by detecting a variation in a steady state of a pressure value of a fluid at the conduit at the test environment. In an embodiment, the transient signal corresponds to a pressure wavefront travelling through a fluid inside the conduit at the test environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A and FIG. 3B are exemplary flow diagrams illustrating a method of detecting the leak event in the real-time conduit based on the template selection, according to an embodiment of the present disclosure.

DETAILED DESCRIPTION

Figure 1:
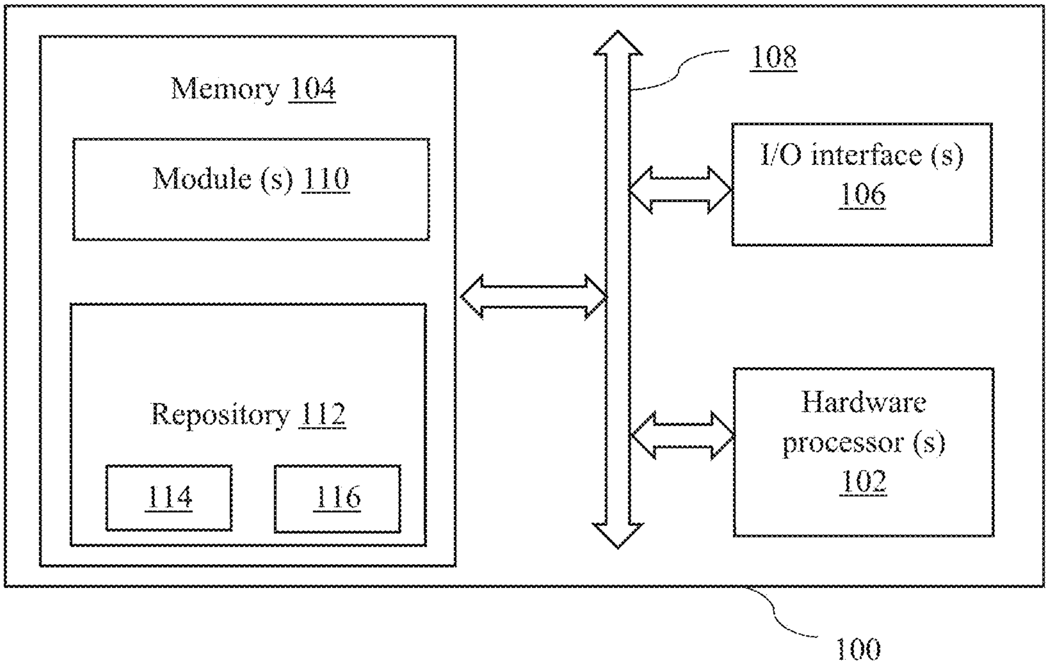
FIG. 1 illustrates a block diagram of a system for automatic detection of a leak event in a real-time conduit by a template selection, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for unobtrusively and automatic leak event detection in a real-time conduit. Embodiments of the present disclosure provide a template matching technique for unobtrusive accelerometer-based leak event detection to isolate negative pressure wave (NPW) signatures from other vibrational signatures on the real-time conduit.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates a block diagram of a system 100 for automatic detection of a leak event in a real-time conduit 218 by a template selection, according to an embodiment of the present disclosure. In an embodiment, the system 100 includes one or more processor(s) 102, communication interface device(s) or input/output (I/O) interface(s) 106, and one or more data storage devices or a memory 104 operatively coupled to the one or more processors 102. The memory 104 includes a database (Not shown in Figure). The one or more processor(s) processor 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor (s) 102 is configured to fetch and execute computer-readable instructions stored in the memory 104. In an embodiment, the system 100 can be implemented in a variety of computing systems, such as laptop computers, notebooks, handheld devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2A:
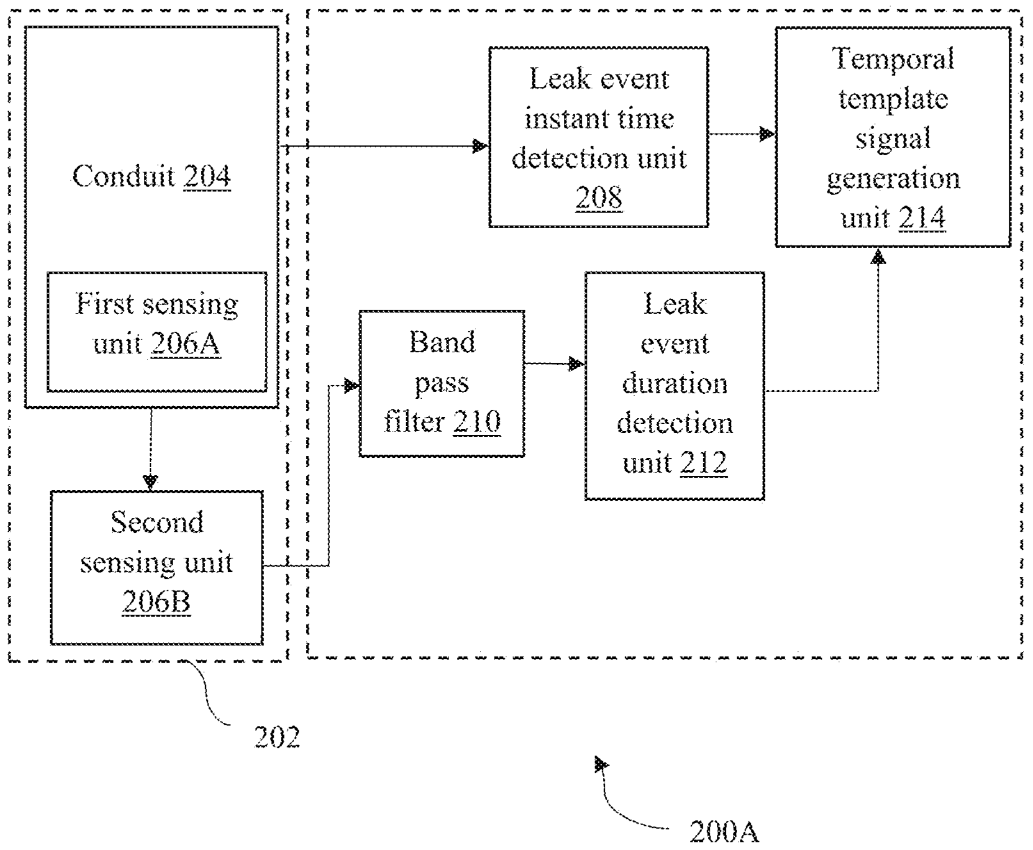
FIG. 2A is functional block diagram of the system of FIG. 1 illustrating a template selection phase, according to an embodiment of the present disclosure.

FIG. 2A is functional block diagram of the system 100 of FIG. 1 illustrating the template selection phase, according to an embodiment of the present disclosure. The system 200A may be an example of the system 100 (FIG. 1). In an example embodiment, the system 200A may be embodied in, or is in direct communication with the system, for example the system 100 (FIG. 1). The system 200A includes a test environment 202, a conduit 204, a first sensing unit 206A, a second sensing unit 206B, a leak event instant time detection unit 208, a bandpass filter 210, a leak event duration detection unit 212, and a temporal template signal generation unit 214. The test environment 202 in which the conduit 204 (e.g., a pipeline) is constructed with a fluid running through. The conduit 204 at the test environment 202 is constructed based on (a) a pipe diameter, (b) a pipe thickness, (c) a material, (d) a flowing fluid, and (e) a pressure level at the conduit 204. The first sensing unit 206A corresponds to a pressure sensor for obtaining a pressure data (Pr). The second sensing unit 206B corresponds to an accelerometer sensor for obtaining the accelerometer data (Accel).

In an embodiment, the pressure sensor 206A is placed inside the conduit 204 of the test environment 202. In an embodiment, the accelerometer sensor 206B is placed on outer surface of the conduit 204 of the test environment 202. An air compressor is utilized to create leaks in a pressurized pipe and exploiting an accelerometer sensor to pick up the negative pressure wave (NPW) signatures on surface of the pipeline. The leak event instant time detection unit 208 is configured to process the pressure data (Pr) obtained from the pressure sensor 206A to obtain an instant timing information ($T_0$) of a leak event in the conduit 204 at the test environment 202. The instant timing information ($T_0$) is obtained by detecting a variation in a steady state of a pressure value of the fluid in the conduit 204 at the test environment 202. The accelerometer data (Accel) obtained from the accelerometer sensor 206B is processed to obtain a transient signal associated with the leak event at a specific band by applying a continuous wavelet transformation (CWT) (i.e., joint time-frequency analysis). The transient signal corresponds to a pressure wavefront travelling through a fluid inside the conduit 204 at the test environment 202.

The bandpass filter 210 is configured to filter the accelerometer data (Accel) to obtain a band passed filtered accelerometer signal ($Accel_{bpf}$) with a low pass cut-off frequency and a high pass cut-off frequency. In an embodiment, the Accel is band passed filtered ($Accel_{bpf}$) between 8 to 300 Hz and the duration of the leak event from the CWT plot is noted ($T_d$). The leak event duration detection unit 212 is configured to process the band passed filtered accelerometer signal ($Accel_{bpf}$) to obtain the duration ($T_d$) of the leak event in the conduit 204 at the test environment 202. The temporal template signal generation unit 214 is configured to truncate the band passed filtered accelerometer signal ($Accel_{bpf}$) in a time domain from the instant timing information ($T_0$) to the duration ($T_d$) of the leak event to obtain a temporal template signal ($Accel_{template}$). In an embodiment, in time domain the $Accel_{bpf}$ is truncated from $T_0$ to $T_0+T_d$.

Figure 2B:
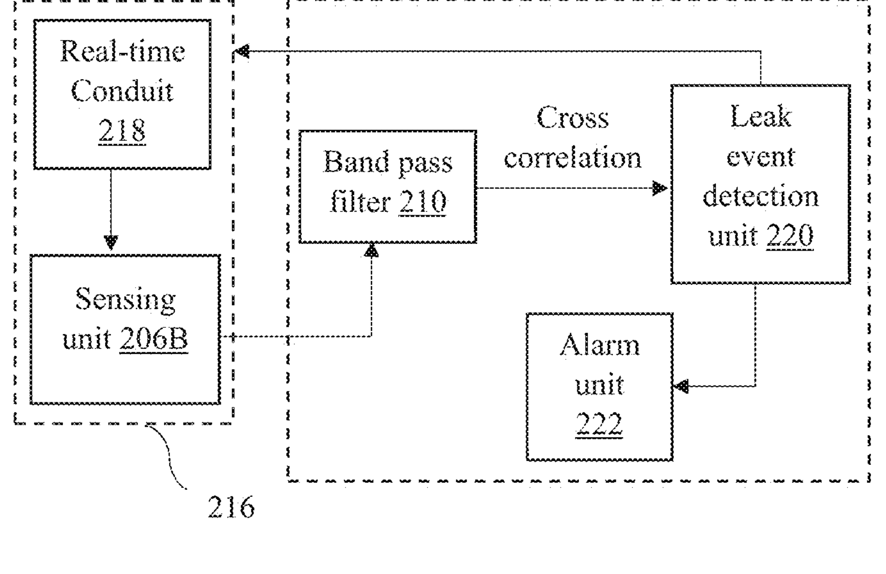
FIG. 2B is functional block diagram of the system of FIG. 1 illustrating a leak event detection phase based on the template selection, according to an embodiment of the present disclosure.

FIG. 2B is functional block diagram of the system 100 of FIG. 1 illustrating the leak event detection phase based on the template selection, according to an embodiment of the present disclosure. The system 200B further includes a real-time conduit 218 at a physical environment 216, a sensing unit 206B, a bandpass filter 210, a leak event detection unit 220, and an alarm unit 224. The second sensing unit 206B corresponds to an accelerometer sensor for obtaining the accelerometer data (Accel). In an embodiment, the accelerometer sensor 206B is unobtrusively placed on outer surface of the real-time conduit 218 of the physical environment 216 and data is recorded continuously. A band passed filtered accelerometer signal ($Accel_{bpf}$) obtained from the bandpass filter 210 of the real-time conduit 218 at the physical environment 216 is cross correlated with the temporal template signal ($Accel_{template}$) for every successive window of $T_0$ to $T_d$ length to obtain a cross correlation value. The leak event detection unit 220 is configured to dynamically detect a leak event of a real-time conduit 218 at a physical environment 216 when the cross-correlation value is greater than a threshold value (c) and subsequently an alarm notification is communicated from the alarm unit 224.

In an embodiment, threshold value (c) may vary from one setup to another i.e., depending upon the pipe length, the pipe diameter etc. In an embodiment, cross-correlation of non-leak vibrational event data with $Accel_{template}$ data, an ∝ value of 0.03 separates most leak events from other vibrational generating events. The cross correlation which is a measurement of similarity of two signals. Consider two signals $X_1(t)$ and $X_2(t)$. The cross correlation of the two signals $R_{12}$ (τ) is given by:

$$R_{12}(\tau) = \int_{-\infty}^{\infty} X_1(t) X_2(t-\tau) dt$$

where $X_1(t)$ is the Accel data collected from the real-time conduit and $X_2(t)$ is the $Accel_{template}$ data generated from the test conduit.

FIG. 3A and FIG. 3B are exemplary flow diagrams illustrating a method 300 of detecting the leak event in the real-time conduit 218 based on the template selection, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1, 2A, and 2B.

At step 302, data associated with the first sensing unit 206A and the second sensing unit 206B are received. The first sensing unit and the second sensing unit are placed in a proximity of the conduit 204 at the test environment 202. In an embodiment, the first sensing unit 206A corresponds to the pressure sensor for obtaining the pressure data (Pr). In an embodiment, the second sensing unit 206B corresponds to the accelerometer sensor for obtaining the accelerometer data (Accel). In an embodiment, the conduit 204 at the test environment 202 is constructed based on (a) a pipe diameter, (b) a pipe thickness, (c) a material, (d) a flowing fluid, and (e) a pressure level at the real-time conduit 218. At step 304, the data associated with the first sensing unit 206A is processed to obtain an instant timing information ($T_0$) of a leak event in the conduit 204 at the test environment 202. In an embodiment, the instant timing information ($T_0$) is obtained by detecting a variation in a steady state of a pressure value of a fluid at the conduit 204 at the test environment 202. At step 306, the data associated with the second sensing unit 206B to obtain a transient signal associated with the leak event at a specific band by applying a continuous wavelet transformation (CWT). In an embodiment, the transient signal corresponds to a pressure wavefront travelling through a fluid inside the conduit 204 at the test environment 202. At step 308, the accelerometer data (Accel) is filtered by the bandpass filter 210 to obtain the band passed filtered accelerometer signal ($Accel_{bpf}$) with the low pass cut-off frequency and the high pass cut-off frequency. At step 310, the band passed filtered accelerometer signal ($Accel_{bpf}$) is processed to obtain the duration ($T_d$) of the leak event. At step 312, the band passed filtered accelerometer signal ($Accel_{bpf}$) is truncated in the time domain from the instant timing information ($T_0$) to the duration ($T_d$) of the leak event to obtain the temporal template signal ($Accel_{template}$). At step 314, the band passed filtered accelerometer signal ($Accel_{bpf}$) obtained from the bandpass filter 210 of the real-time conduit 218 at the physical environment 216 is cross correlated with the temporal template signal ($Accel_{template}$) for every successive window of $T_0$ and $T_d$ length to obtain a cross correlation value. At step 316, the leak event of the real-time conduit 218 at the physical environment 216 is dynamically detected when the cross-correlation value is greater than a threshold value (∝) and subsequently an alarm notification is communicated from the alarm unit 224.

Experimental Results

For example, a study is conducted to detect the leak event in the real-time conduit 218 based on the template selection. The air compressor is attached to the inlet of the pipe to pressurize the pipeline. The parameters for constructing a conduit at a test environment is depicted below in table 1.

TABLE 1

| S. No | Parameter | Value | Unit |
|---|---|---|---|
| 1 | Pipe outer diameter | 80 | mm |
| 2 | Pipe Length | 3 | m |
| 3 | Pipe Thickness | 5 | mm |
| 4 | Leak Diameter | 3.4 | mm |
| 5 | Leak Distance from sensor1 | 1.5621 | m |
| 6 | Leak Distance from sensor2 | 1.2319 | m |

The compressor can generate pressure up to 110-120 PSI. Safety valves are present in this pipeline setup to avoid any unprecedented event. The sensors used for the experiment is accelerometer sensor and are completely non-invasive. The sensors are placed at the two ends of the pipeline. One pressure sensor is also used in this experimental setup. A manual leak valve is placed around middle of the pipe. The distance between two sensors is 2.794 m. Leak point consist of a leak value that can be manually opened through a pulley system. When leak happens NPW is generated from a leak orifice and the NPW has low frequency components which can travel very long distance in both upstream and downstream.

Figure 4:
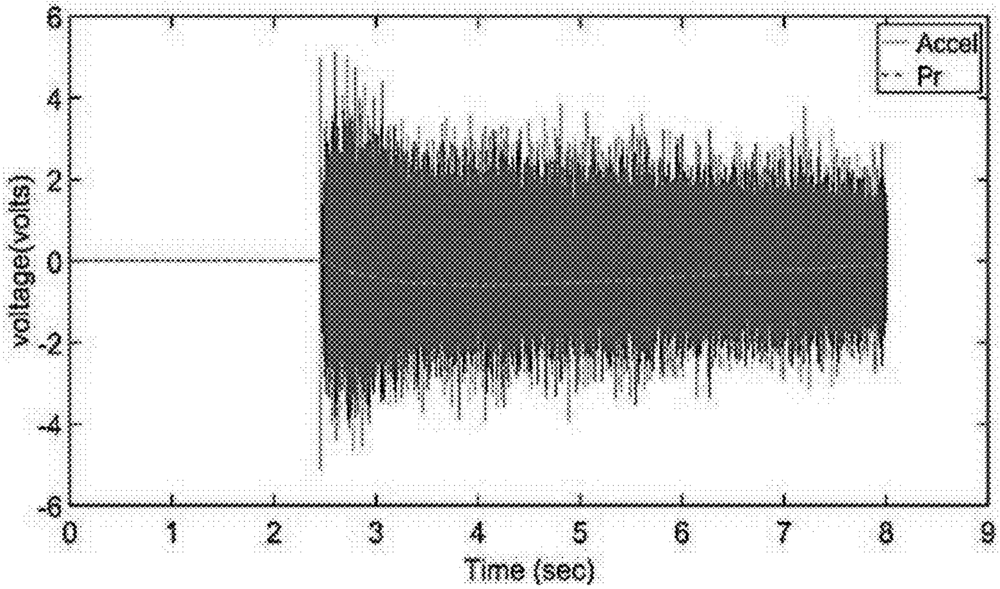
FIG. 4 is an exemplary graphical representation which illustrates a pressure sensor data (Pr) and an accelerometer data (Accel) at a time domain received from a pressure sensor and an accelerometer sensor respectively, according to an embodiment of the present disclosure.
Figure 5:
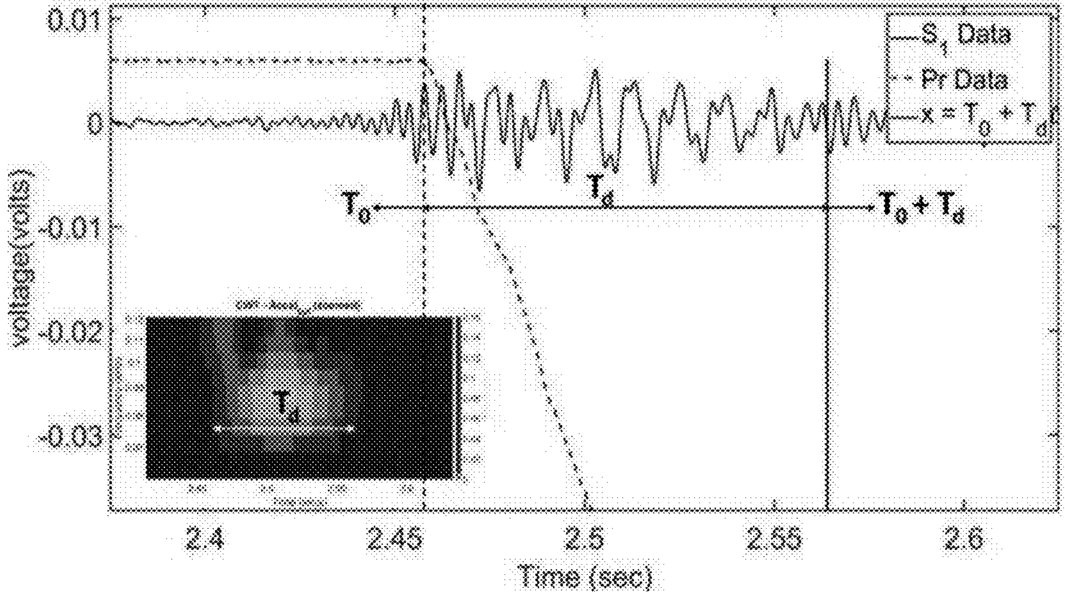
FIG. 5 is an exemplary graphical representation which illustrates a bandpass filtered accelerometer signal ($Accel_{bpf}$) and the pressure sensor data at 50 PSI, according to an embodiment of the present disclosure.
Figure 6:
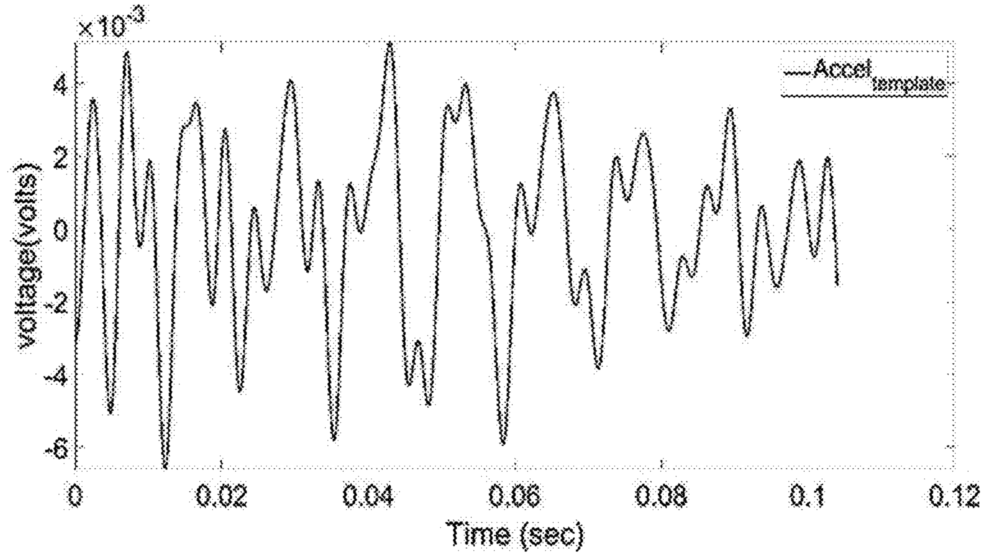
FIG. 6 is an exemplary graphical representation which illustrates a temporal template signal ($Accel_{template}$) of the bandpass filtered accelerometer signal ($Accel_{bpf}$), according to an embodiment of the present disclosure.

FIG. 4 is an exemplary graphical representation which illustrates the pressure sensor data (Pr) and the accelerometer data (Accel) at the time domain received from the pressure sensor and the accelerometer sensor respectively, according to an embodiment of the present disclosure. FIG. 5 is an exemplary graphical representation which illustrates the bandpass filtered accelerometer signal ($Accel_{bpf}$) and the pressure sensor data at 50 PSI, according to an embodiment of the present disclosure. FIG. 6 is an exemplary graphical representation which illustrates the temporal template signal ($Accel_{template}$) of the bandpass filtered accelerometer signal ($Accel_{bpf}$), according to an embodiment of the present disclosure. The bandpass filtered accelerometer data i.e., $Accel_{bpf}$ and Pr data as depicted in FIG. 4. The $T_0$ is measured from Pr offset, whereas $T_d$ is calculated from the CWT (shown in inset) of $Accel_{bpf}$. The $T_0$ is 2.46 sec and $T_d$ is 0.104 sec. Next, $Accel_{template}$ is obtained by truncating $Accel_{bpf}$ from $T_0$ to $(T_0+T_d)$ i.e., from 2.46 sec to 2.564 sec and is depicted in FIG. 5. In FIG. 6, the $Accel_{template}$ is cross-correlated with a new $Accel_{bpf}$ data collected at 25 PSI where the leak was done at 1.14 sec and a max cross-correlation was found exactly at 1.14 sec. The same process is repeated at different PSI levels and the max cross-correlation occurred at the exact leak instant as detected by the Pr data with a max cross-correlation value greater than c.

Embodiment of the present disclosure provides a template matching based approach for unobtrusive accelerometer-based leak event detection to isolate negative pressure wave (NPW) signatures from other vibrational signatures on the real-time conduit. The embodiment of the present disclosure offers complete non-invasive yet robust solution for capturing very low frequency NPW waves. The selected template is exactly tuned to the actual world pipeline at hand there is no need for a leak model/simulation. The proposed approach provides a choice of the BPF range is specific for one pipeline under test. The proposed approach reduces the false alarm rate. The template selection approach is parameter agnostic. The proposed approach treats the entire pipeline system as a nonlinear system and treats leak signature/template as a weighted sum of sinusoids of different frequencies. The frequencies are obtained from a small-scale lab setup of the actual pipeline with all parameters (e.g., pipe diameter, material, flowing fluid, pressure level) same. Hence, immune to environmental noises and/or other vibrations generated through non-leak events. The proposed approach is non-invasive in nature, suitable for larger distances and computationally much simpler as, during the template generation phase and actual field deployment, band restricting the accel signal which eliminates unnecessary computations, and the template guarantees proper match with the leak event.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, data associated with a first sensing unit and a second sensing unit, wherein the first sensing unit and the second sensing unit are placed in a proximity of a conduit at a test environment, wherein the first sensing unit corresponds to a pressure sensor placed inside the conduit at the test environment, for obtaining a pressure data (Pr), and wherein the second sensing unit corresponds to an accelerometer sensor placed on an outer surface of the conduit at the test environment, for obtaining an accelerometer data (Accel);

processing, via the one or more hardware processors, the data associated with the first sensing unit to obtain an instant timing information ($T_0$) of a leak event in the conduit at the test environment, wherein the instant timing information ($T_0$) is obtained by detecting a variation in a steady state of a pressure value of a fluid at the conduit at the test environment;

processing, via the one or more hardware processors, the data associated with the second sensing unit to obtain a transient signal associated with the leak event at a specific band by applying a continuous wavelet transformation (CWT);

filtering, by a bandpass filter, the accelerometer data (Accel) to obtain a band passed filtered accelerometer signal ($Accel_{bpf}$) with a low pass cut-off frequency and a high pass cut-off frequency by eliminating unnecessary computations;

processing, via the one or more hardware processors, the band passed filtered accelerometer signal ($Accel_{bpf}$) to obtain a duration ($T_d$) of the leak event;

truncating, via the one or more hardware processors, the band passed filtered accelerometer signal ($Accel_{bpf}$) in a time domain from the instant timing information ($T_0$) to the duration (Td) of the leak event to obtain a temporal template signal ($Accel_{template}$);

receiving, via the one or more hardware processors, data associated with a sensing unit, wherein the sensing unit corresponds to an accelerometer sensor placed on an outer surface of a real-time conduit of a physical environment, for obtaining an accelerometer data and the data is recorded continuously;

filtering, by a bandpass filter, the accelerometer data to obtain a band passed filtered accelerometer signal ($Accel_{bpf}$) associated with the real-time conduit with a low pass cut-off frequency and a high pass cut-off frequency;

cross-correlating, via the one or more hardware processors, the band passed filtered accelerometer signal ($Accel_{bpf}$) associated with the real-time conduit at the physical environment and the temporal template signal ($Accel_{template}$) for every successive window of $T_0$ to $T_d$ length to obtain a cross correlation value; and dynamically detecting, via the one or more hardware processors, a leak event of the real-time conduit at the physical environment when the cross-correlation value is greater than a threshold value ($\propto$), and communicating an alarm notification thereby reducing a false alarm rate during routine pipe maintenance, wherein when leak occurs a low frequency negative pressure wave (NPW) is generated from a leak orifice and the NPW has low frequency components which travels long distance in both upstream and downstream directions;

isolating, via the one or more hardware processors, the NPW from other vibrational generating events on the real-time conduit based on the cross-correlation value and the threshold value ($\propto$).

2. The processor implemented method of claim 1, wherein the conduit at the test environment is constructed based on (a) a pipe diameter, (b) a pipe thickness, (c) a material, (d) a flowing fluid, and (e) a pressure level at the real-time conduit.

3. The processor implemented method of claim 1, wherein the threshold value ($\propto$) vary from one setup to another depending upon a pipe diameter and a pipe length.

4. The processor implemented method of claim 1, wherein the cross correlation value $R_{12}(\tau)$ is a measurement of a similarity of two signals $X_1(t)$ and $X_2(t)$ and $R_{12}(\tau)$ is given by:

$$R_{12}(\tau)=\int_{-\infty}^{\infty} X_1(t) X_2(t-\tau)dt$$

where $X_1(t)$ is the accelerometer data collected from the real-time conduit and $X_2(t)$ is the $Accel_{template}$ data generated from the conduit at the test environment.

5. The processor implemented method of claim 1, wherein the transient signal corresponds to a pressure wavefront travelling through a fluid inside the conduit at the test environment.

6. A system, comprising:

a memory storing instructions;

one or more communication interfaces; and one or more hardware processors coupled to the memory via the one or more communication interfaces, wherein the one or more hardware processors are configured by the instructions to:

receive, data associated with a first sensing unit and a second sensing unit, wherein the first sensing unit and the second sensing unit are placed in a proximity of a conduit at a test environment, wherein the first sensing unit corresponds to a pressure sensor placed inside the conduit at the test environment, for obtaining a pressure data (Pr), and wherein the second sensing unit corresponds to an accelerometer sensor placed on an outer surface of the conduit at the test environment, for obtaining an accelerometer data (Accel);

process, the data associated with the first sensing unit to obtain an instant timing information ($T_0$) of a leak event in the conduit at the test environment, wherein the instant timing information ($T_0$) is obtained by detecting a variation in a steady state of a pressure value of a fluid at the conduit at the test environment;

process, the data associated with the second sensing unit to obtain a transient signal associated with the leak event at a specific band by applying a continuous wavelet transformation (CWT);

filter, by a bandpass filter, the accelerometer data (Accel) to obtain a band passed filtered accelerometer signal ($Accel_{bpf}$) with a low pass cut-off frequency and a high pass cut-off frequency by eliminating unnecessary computations;

process, the band passed filtered accelerometer signal ($Accel_{bpf}$) to obtain a duration (Ta) of the leak event;

truncate, the band passed filtered accelerometer signal ($Accel_{bpf}$) in a time domain from the instant timing information ($T_0$) to the duration (Ta) of the leak event to obtain a temporal template signal ($Accel_{template}$);

receive, data associated with a sensing unit, wherein the sensing unit corresponds to an accelerometer sensor placed on an outer surface of a real-time conduit of a physical environment, for obtaining an accelerometer data and the data is recorded continuously;

filter, by a bandpass filter, the accelerometer data to obtain a band passed filtered accelerometer signal ($Accel_{bpf}$) associated with the real-time conduit with a low pass cut-off frequency and a high pass cut-off frequency;

cross-correlate, the band passed filtered accelerometer signal ($Accel_{bpf}$) associated with the real-time conduit at the physical environment and the temporal template signal ($Accel_{template}$) for every successive window of $T_0$ to $T_d$ length to obtain a cross correlation value; and dynamically detect, a leak event of the real-time conduit at the physical environment when the cross-correlation value is greater than a threshold value ($\propto$), and communicate an alarm notification thereby reducing a false alarm rate during routine pipe maintenance, wherein when leak occurs a low frequency negative pressure wave (NPW) is generated from a leak orifice and the NPW has low frequency components which travels long distance in both upstream and downstream directions;

isolate, the NPW from other vibrational generating events on the real-time conduit based on the cross-correlation value and the threshold value ($\propto$).

7. The system of claim 6, wherein the conduit at the test environment is constructed based on (a) a pipe diameter, (b) a pipe thickness, (c) a material, (d) a flowing fluid, and (e) a pressure level at the real-time conduit.

8. The system of claim 6, wherein the threshold value ($\propto$) vary from one setup to another depending upon a pipe diameter and a pipe length.

9. The system of claim 6, wherein the cross correlation value $R_{12}(\tau)$ is a measurement of a similarity of two signals $X_1(t)$ and $X_2(t)$ and $R_{12}(\tau)$ is given by:

$$R_{12}(\tau)=\int_{-\infty}^{\infty}X_1(t)X_2(t-\tau)dt$$

where $X_1(t)$ is the accelerometer data collected from the real-time conduit and $X_2(t)$ is the $Accel_{template}$ data generated from the conduit at the test environment.

10. The system of claim 6, wherein the transient signal corresponds to a pressure wavefront travelling through a fluid inside the conduit at the test environment.

11. One or more non-transitory machine-readable information storage mediums comprising one or more instructions which when executed by one or more hardware processors cause:

receiving, data associated with a first sensing unit and a second sensing unit, wherein the first sensing unit and the second sensing unit are placed in a proximity of a conduit at a test environment, wherein the first sensing unit corresponds to a pressure sensor placed inside the conduit at the test environment, for obtaining a pressure data (Pr), and wherein the second sensing unit corresponds to an accelerometer sensor placed on an outer surface of the conduit at the test environment, for obtaining an accelerometer data (Accel);

processing, the data associated with the first sensing unit to obtain an instant timing information ($T_0$) of a leak event in the conduit at the test environment, wherein the instant timing information ($T_0$) is obtained by detecting a variation in a steady state of a pressure value of a fluid at the conduit at the test environment;

processing, the data associated with the second sensing unit to obtain a transient signal associated with the leak event at a specific band by applying a continuous wavelet transformation (CWT);

filtering, by a bandpass filter, the accelerometer data (Accel) to obtain a band passed filtered accelerometer signal ($Accel_{bpf}$) with a low pass cut-off frequency and a high pass cut-off frequency by eliminating unnecessary computations;

processing, the band passed filtered accelerometer signal ($Accel_{bpf}$) to obtain a duration ($T_d$) of the leak event;

truncating, the band passed filtered accelerometer signal ($Accel_{bpf}$) in a time domain from the instant timing information ($T_0$) to the duration (Ta) of the leak event to obtain a temporal template signal ($Accel_{template}$);

receiving, data associated with a sensing unit, wherein the sensing unit corresponds to an accelerometer sensor placed on an outer surface of a real-time conduit of a physical environment, for obtaining an accelerometer data and the data is recorded continuously;

filtering, by a bandpass filter, the accelerometer data to obtain a band passed filtered accelerometer signal ($Accel_{bpf}$) associated with the real-time conduit with a low pass cut-off frequency and a high pass cut-off frequency;

cross-correlating, the band passed filtered accelerometer signal ($Accel_{bpf}$) associated with the real-time conduit at the physical environment and the temporal template signal ($Accel_{template}$) for every successive window of $T_0$ to $T_d$ length to obtain a cross correlation value; and dynamically detecting, a leak event of the real-time conduit at the physical environment when the cross-correlation value is greater than a threshold value ($\propto$), and communicating an alarm notification thereby reducing a false alarm rate during routine pipe maintenance, wherein when leak occurs a low frequency negative pressure wave (NPW) is generated from a leak orifice and the NPW has low frequency components which travels long distance in both upstream and downstream directions;

isolating, the NPW from other vibrational generating events on the real-time conduit based on the cross-correlation value and the threshold value ($\propto$).

12. The one or more non-transitory machine-readable information storage mediums of claim 11, wherein the conduit at the test environment is constructed based on (a) a pipe diameter, (b) a pipe thickness, (c) a material, (d) a flowing fluid, and (e) a pressure level at the real-time conduit.

13. The one or more non-transitory machine-readable information storage mediums of claim 11, wherein the threshold value ($\propto$) vary from one setup to another depending upon a pipe diameter and a pipe length.

14. The one or more non-transitory machine-readable information storage mediums of claim 11, wherein the cross correlation value $R_{12}(\tau)$ is a measurement of a similarity of two signals $X_1(t)$ and $X_2(t)$ and $R_{12}(\tau)$ is given by:

$$R_{12}(\tau)=\int_{-\infty}^{\infty} X_1(t)X_2(t-\tau)dt$$

where $X_1(t)$ is the accelerometer data collected from the real-time conduit and $X_2(t)$ is the $Accel_{template}$ data generated from the conduit at the test environment.

15. The one or more non-transitory machine-readable information storage mediums of claim 11, wherein the transient signal corresponds to a pressure wavefront travelling through a fluid inside the conduit at the test environment.

* * * * *